United States Patent
Fletcher

(10) Patent No.: US 7,221,774 B2
(45) Date of Patent: May 22, 2007

(54) LOCAL PHASE FILTER TO ASSIST CORRELATION

(75) Inventor: Peter Alleine Fletcher, Rozelle (AU)

(73) Assignee: Canon Kabushiki Kaisha, Tokyo (JP)

( * ) Notice: Subject to any disclaimer, the term of this patent is extended or adjusted under 35 U.S.C. 154(b) by 850 days.

(21) Appl. No.: 10/400,581

(22) Filed: Mar. 28, 2003

(65) Prior Publication Data

US 2003/0231768 A1 Dec. 18, 2003

(30) Foreign Application Priority Data

Mar. 28, 2002 (AU) .................................. PS1399

(51) Int. Cl.
*G06K 9/00* (2006.01)
(52) U.S. Cl. ..................... 382/100; 382/250; 380/201
(58) Field of Classification Search ............... 382/100, 382/168, 232, 233, 235, 238, 239, 243, 248, 382/250, 260, 274, 276, 280, 290, 300, 305; 380/201, 210; 358/426.03
See application file for complete search history.

(56) References Cited

U.S. PATENT DOCUMENTS

| | | | | |
|---|---|---|---|---|
| 5,001,766 A | * | 3/1991 | Baird | 382/290 |
| 5,862,260 A | * | 1/1999 | Rhoads | 382/232 |
| 6,275,599 B1 | * | 8/2001 | Adler et al. | 382/100 |
| 6,614,914 B1 | * | 9/2003 | Rhoads et al. | 382/100 |
| 6,714,683 B1 | * | 3/2004 | Tian et al. | 382/240 |
| 2002/0172398 A1 | | 11/2002 | Hayahi | 382/100 |

FOREIGN PATENT DOCUMENTS

FR 2 782 223 8/1998
WO WO 02/17214 A2 2/2002

OTHER PUBLICATIONS

U.S. Appl. No. 09/983,031, filed Oct. 22, 2001, Peter Alleine Fletcher et al.
U.S. Appl. No. 10/323,776, filed Dec. 20, 2002, Peter Alleine Fletcher et al.

\* cited by examiner

*Primary Examiner*—Matthew C. Bella
*Assistant Examiner*—Seyed Azarian
(74) *Attorney, Agent, or Firm*—Fitzpatrick, Cella, Harper & Scinto

(57) ABSTRACT

A local phase filter (315) for pre-processing data (310) including a watermark (320) is disclosed. The data (310) is pre-processed before detecting the watermark by correlation of the data (310) with the watermark (320). The local phase filter (315) starts by dividing the data (310) into a set of smaller sub-spaces. The frequency coefficients of the data contained in each sub-space are then computed, and the frequency amplitudes of the frequency coefficients are then spectrally shaped. Preferably, the amplitudes of the frequency coefficients of the sub-space are set to a predetermined function. Finally, filtered watermarked data is formed, having the same size as that of the data (310), by adding the filtered data of each sub-space together in the sub-space's original position.

17 Claims, 8 Drawing Sheets

LOCAL PHASE FILTER TO ASSIST CORRELATION

TECHNICAL FIELD OF THE INVENTION

The present invention relates generally to the detection of imperceptible watermark patterns in data and, in particular, to the local enhancement and restoration of phase information of an embedded watermark, thereby assisting the detection of the watermark pattern using correlation.

BACKGROUND

With the advent of digital multimedia data and digital multimedia data distribution, protection of such digital multimedia data against unauthorised copying and dissemination have become an issue for multimedia data publishers and authors. One technique used to identify ownership is to embed a pattern or patterns into the data, such that the embedded pattern is typically imperceptible to an observer. Such a pattern is called a watermark pattern, or simply a watermark. The presence of the watermark pattern can be detected in copied data by the owner of the original data, thereby proving their ownership.

A difficulty arises with respect to embedding watermark patterns into the data in such a way that the watermark patterns are both imperceptible to the human senses, and for each embedded watermark pattern to be reliably detected. In general, the watermarked data may be transformed or processed, making the detection of the watermark patterns more difficult to reliably detect. Processing that is often applied to image data is printing and then subsequent scanning of the printed image. During the printing and scanning processes, the high frequency components of the watermark pattern are often attenuated. Other processing that typically adversely affects the reliable detection of the watermark pattern includes interpolation during image rotation or scaling, or even malicious attack.

Several watermarking schemes use spread-spectrum signals as watermark patterns. Two advantages of using spread-spectrum signals as watermark patterns are the very sharp peaks obtained when using correlation to detect the watermark pattern, and also the presence of relatively large high-frequency components, which are generally less perceptible than low frequencies.

Because images commonly contain a predominance of low frequencies, direct correlation of a watermarked image with the spread-spectrum embedding watermark pattern will be dominated by the low frequencies of the image, resulting in a blurred correlation image in which correlation peaks, corresponding with the positions where the watermark patterns were embedded in the image, may not be discernible.

A related problem is the problem of correlation of data features with the watermark pattern during correlation, also causing interference. While usually not a problem with pseudo-random noise watermarks, this can be a problem with watermark patterns based upon logarithmic radial harmonic functions. For example, if the features of an image contain strong curved fringes, such as an image of spiral sea shells, additional noise may be caused during correlation of such an image with a logarithmic radial harmonic function based watermark pattern, which may obscure the correlation peaks.

Occasionally special forms of correlation are used to address this problem and restore the peaks.

One such special form of correlation is frequency pre-emphasis of the watermarked data before correlation with the watermark pattern. A linear or quadratic scaling factor applied to the high frequencies will reduce the influence of the data's low frequencies, and increase the influence of the flat spectrum of the watermark patterns, resulting in sharp, visible detection peaks.

Another special form of correlation often used is phase correlation in which all frequency components are set to a constant amplitude in the Fourier domain during correlation of the watermarked data with the watermark pattern. Because phase correlation weights all frequencies equally, it has the additional advantage of restoring the high frequency components of the embedded watermark patterns where they have been attenuated.

Although very effective in enhancing correlation peaks and reducing interference from the data, phase correlation and frequency emphasis are inherently applied equally over all data samples of the watermarked data, and are thus completely insensitive to any local variations in the watermarked data.

SUMMARY OF THE INVENTION

It is an object of the present invention to substantially overcome, or at least ameliorate, one or more disadvantages of existing arrangements.

According to a first aspect of the invention, there is provided a method of pre-processing data including a watermark before detecting said watermark by correlating said data with said watermark, said method comprising the steps of:

(a) dividing said data into a plurality of sub-spaces, each sub-space being associated with a position within said data;

(b) for each sub-space, spectral shaping frequency amplitudes of the data of said sub-space to a predetermined function; and (c) adding said data of said sub-spaces at positions corresponding with said sub-space positions.

According to another aspect of the invention, there is provided an apparatus for implementing the aforementioned method.

According to another aspect of the invention there is provided a computer program product including a computer readable medium having recorded thereon a computer program for implementing the method described above.

Other aspects of the invention are also disclosed.

BRIEF DESCRIPTION OF THE DRAWINGS

One or more embodiments of the present invention will now be described with reference to the drawings, in which.

DETAILED DESCRIPTION INCLUDING BEST MODE

Figure 1:
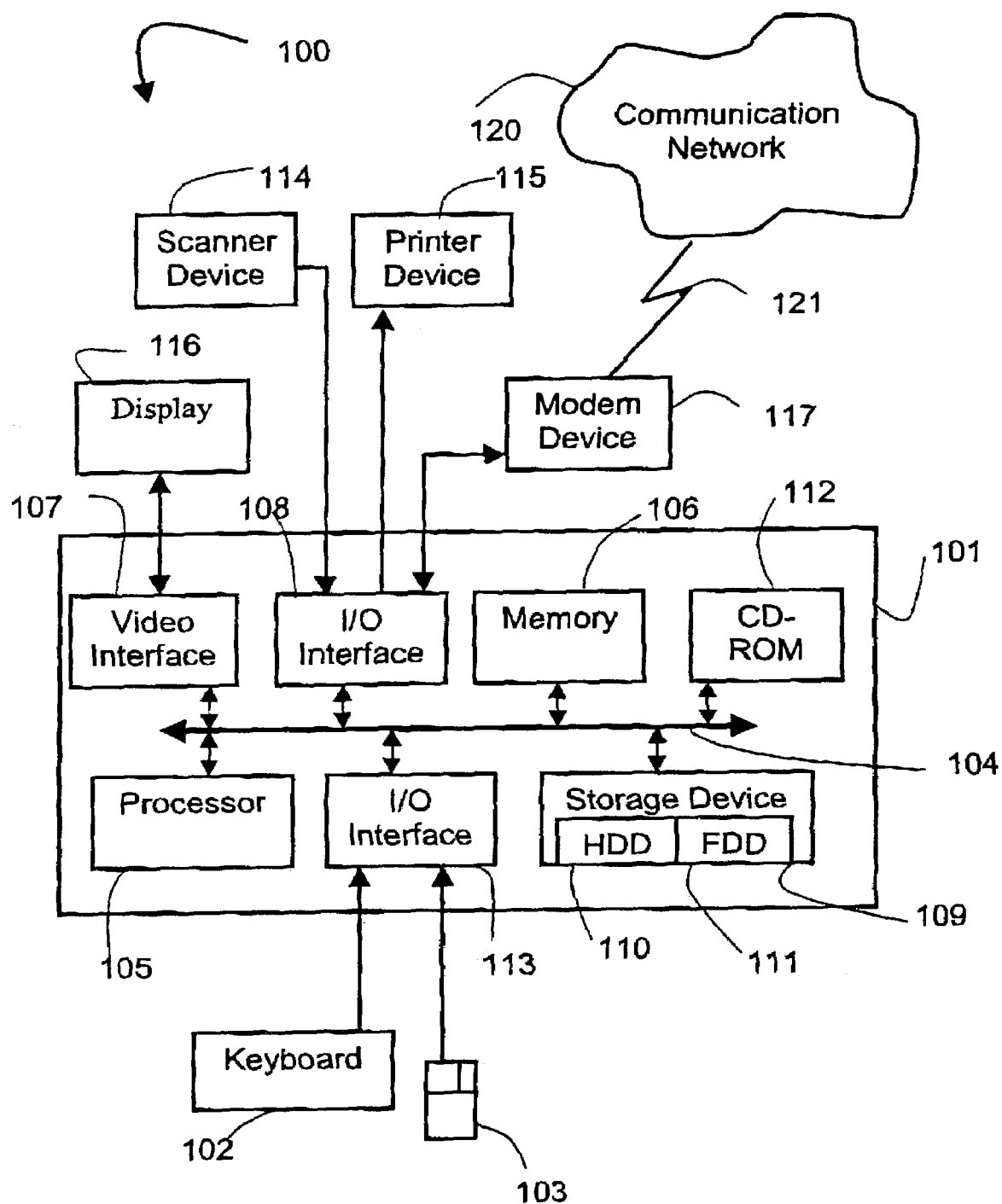
FIG. 1 is a schematic block diagram of a general purpose computer system upon which arrangements described can be practiced.

Where reference is made in any one or more of the accompanying drawings to steps and/or features, which have the same reference numerals, those steps and/or features have for the purposes of this description the same function(s) or operation(s), unless the contrary intention appears.

Some portions of the description which follows are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that the above and similar terms are to be associated with the appropriate physical quantities and are merely convenient labels applied to these quantities.

FIG. 1 is a schematic block diagram of a general-purpose computer system 100. The computer system 100 comprises a computer module 101, input devices such as a scanner 114, a keyboard 102 and mouse 103, and output devices including a printer 115 and a display device 116. A Modulator-Demodulator (Modem) transceiver device 117 is used by the computer module 101 for communicating to and from a communications network 120, for example connectable via a telephone line 121 or other functional medium. The modem 117 can be used to obtain access to the Internet, and other network systems, such as a Local Area Network (LAN) or a Wide Area Network (WAN).

The computer module 101 typically includes at least one processor unit 105, a memory unit 106, for example formed from semiconductor random access memory (RAM) and read only memory (ROM), input/output (I/O) interfaces including a video interface 107, and an I/O interface 113 for the keyboard 102 and mouse 103, and an interface 108 for the modem 117, the printer 155 and the scanner 114. A storage device 109 is provided and typically includes a hard disk drive 110 and a floppy disk drive 111. A CD-ROM drive 112 is typically provided as a non-volatile source of data. The components 105 to 113 of the computer module 101, typically communicate via an interconnected bus 104 and in a manner which results in a conventional mode of operation of the computer system 100 known to those in the relevant art.

Figure 2A:
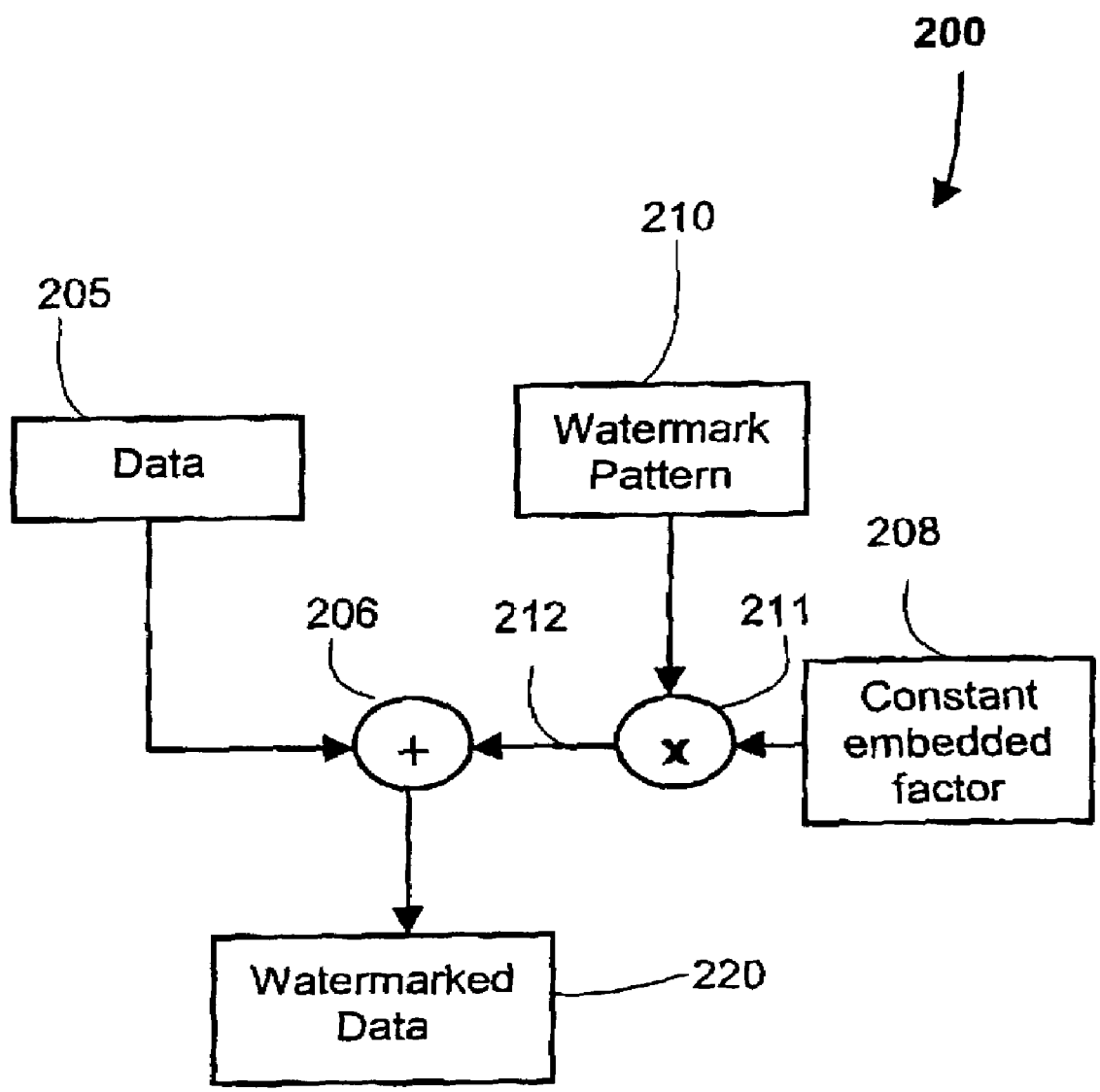
FIG. 2A shows a schematic diagram of a process of watermarking data with a watermark pattern.

FIG. 2A shows a schematic diagram of a process 200 of watermarking data 205 with a watermark pattern 210. Process 200 is preferably practiced using the general-purpose computer system 100 (FIG. 1), wherein the steps of process 200 may be implemented as software, such as an application program executing within the computer system 100. In particular, the steps of process 200 are performed by instructions in the software that are carried out by the computer system 100. Typically, the application program is resident on the hard disk drive 110 and read and controlled in its execution by the processor 105. Intermediate storage of the program and any data fetched from the network 120 may be accomplished using the semiconductor memory 106, possibly in concert with the hard disk drive 110.

The application program may be supplied to the user encoded on a CD-ROM or floppy disk and read via the corresponding drive 112 or 111, or alternatively may be read by the user from the network 120 via the modem device 116. Still further, the software can also be loaded into the computer system 100 from other computer readable media The term "computer readable medium" as used herein refers to any storage or transmission medium that participates in providing instructions and/or data to the computer system 100 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 101. Examples of transmission media include radio or infra-red transmission channels as well as a network connection to another computer or networked device, and the Internet or Intranets including e-mail transmissions and information recorded on websites and the like.

The process 200 may alternatively be implemented in dedicated hardware such as one or more integrated circuits performing the functions or sub functions of process 200. Such dedicated hardware may include graphic processors, digital signal processors, or one or more microprocessors and associated memories.

Referring again to FIG. 2A, the data 205 is typically one-dimensional data, such as audio data, two-dimensional data, such as image data, or three-dimensional data, such as data for a video sequence or for a tomographic scan. However, the data 205 may be data having any number of dimensions.

Preferably, the watermark pattern 210 when embedded into the data 205 is imperceptible to the human sensory system under normal conditions. For example, when the watermark pattern 210 is added to image data, then it is desirable for the pattern 210 to be invisible to the human visual system. Imperceptibility is achieved by multiplying 211 the watermark pattern 210 with a constant embedded factor 208 to form a low intensity copy 212 of the watermark pattern 210. The low intensity copy 212 of the watermark pattern 210 is the simply added 206 to the data 205 to form watermarked data 220.

If the data 205 is a colour image, then the watermark pattern 210 is added to the luminance part of the colour image. This allows the watermark to survive when the watermarked image is converted from colour to a greyscale representation.

The watermarked data 220 may be stored on the storage device 109 of the computer system 100, transmitted to another computer system 100 through communications network 120 or, in the case of image data, printed on printer 115.

Figure 6A:
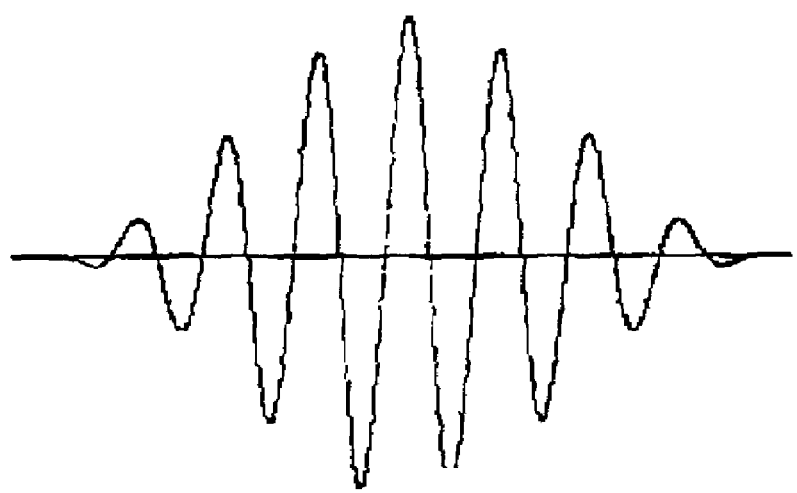
FIG. 6A shows example one-dimensional data.
Figure 6B:
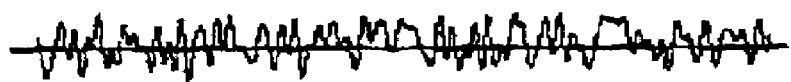
FIG. 6B shows an example watermark pattern.
Figure 6C:
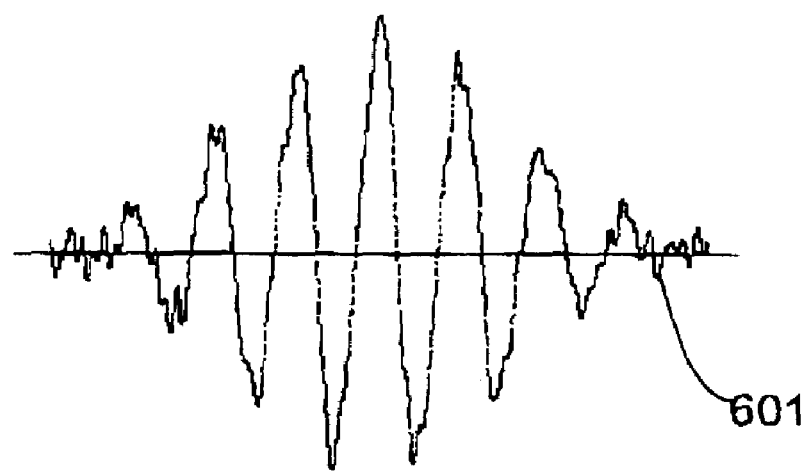
FIG. 6C shows one-dimensional watermarked data formed by embedding the example watermark pattern of FIG. 6B into the example one-dimensional data of FIG. 6A.

FIG. 6C shows one-dimensional watermarked data formed by adding the watermark pattern represented in FIG.

6B to the one-dimensional data shown in FIG. 6A. The watermark pattern is perceptible in regions having low intensity variation, such as region 601.

Often, even when the constant embedded factor 208 is small, making the level of the watermark pattern 210 significantly lower than that of the data 205 in the watermarked data 220, the watermark pattern 210 is still perceptible in regions of the data 205 having low intensity variation. For example, in region 601 of the one-dimensional watermarked data shown in FIG. 6C, and assuming the data is audio data, the watermark pattern would still be perceptible during the play-back of the audio data contained in region 601.

An adaptive watermark embedding scheme, such as perceptual masking, is often used to reduce the level of the watermark in regions having low intensity variation and increase the level of the watermark in regions of high intensity variance.

Figure 2B:
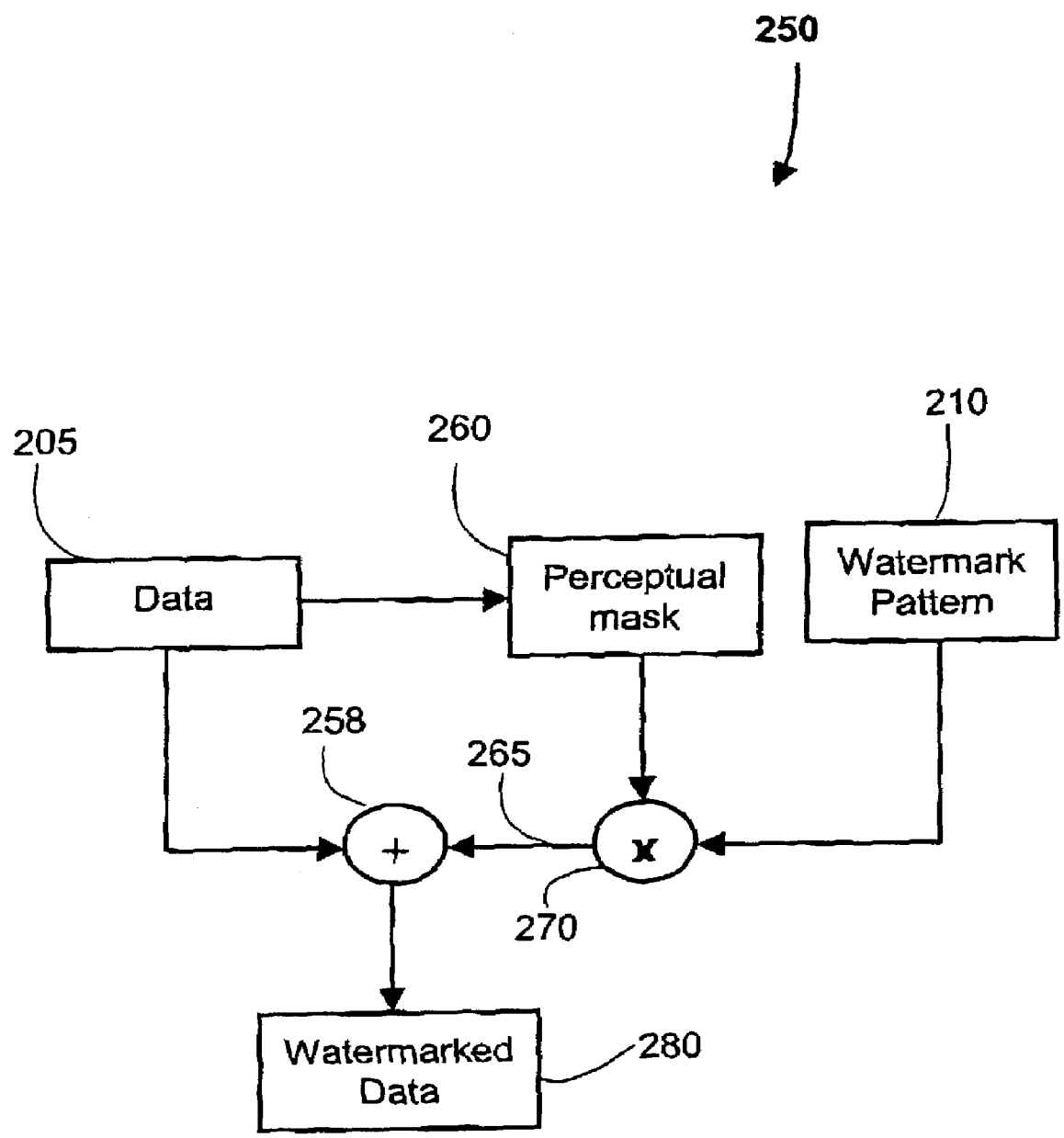
FIG. 2B shows a schematic diagram of an alternative process of watermarking data in which an adaptive watermark embedding scheme is used.

FIG. 2B shows a schematic diagram of an alternative process 250 of watermarking data 205 in which an adaptive watermark embedding scheme is used. A perceptual mask 260 is formed from the data 205. The perceptual mask 260 may be formed by evaluation of the local gradient magnitude of the data 205, such as the local gradient magnitude of the luminance in an image in the case where the data is image data. The perceptual mask 260 may alternatively be formed by evaluation of the second partial derivatives of the data; local estimates of the "energy" or frequency content, local variance, and more sophisticated estimates of human visual system masking.

The watermark pattern 210 is then de-emphasised with the perceptual mask 260 by multiplying 270 the values of the watermark pattern 210 with the corresponding values of the perceptual mask 260. This de-emphasised pattern 265 is added 258 to the data 205 to form watermarked data 280.

Figure 6D:
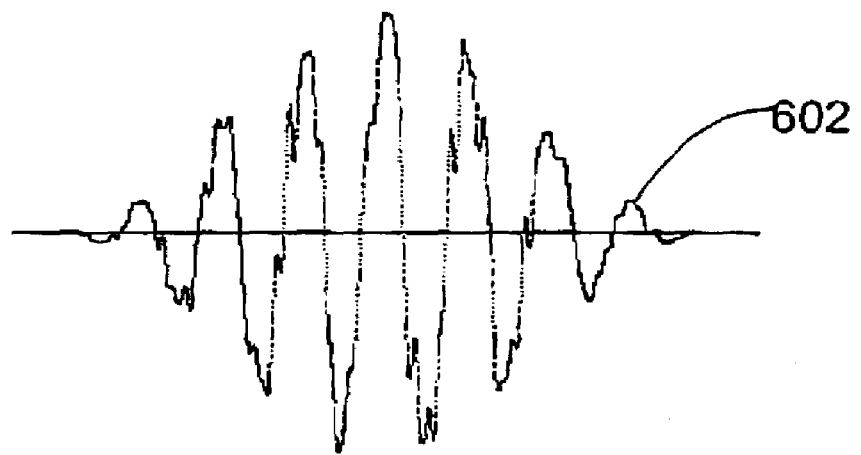
FIG. 6D shows one-dimensional watermarked data formed by adaptively embedding the example watermark pattern of FIG. 6B into the example one-dimensional data of FIG. 6A.

FIG. 6D shows one-dimensional watermarked data formed by the adaptive scheme shown in FIG. 2B. The watermark pattern would be less perceptible during the play-back of region 602, which corresponds with region 601 in FIG. 6C.

Before detection of the watermark pattern 210, it is desirable to normalise the level of the embedded watermark pattern across the watermarked data 280. Ideally, this normalisation should be performed by dividing the watermarked data 280 by the original perceptual mask 260. However, because the original perceptual mask 260 may not be known during detection, it would necessary to compute an approximation based on the watermarked data 280.

Figure 3:
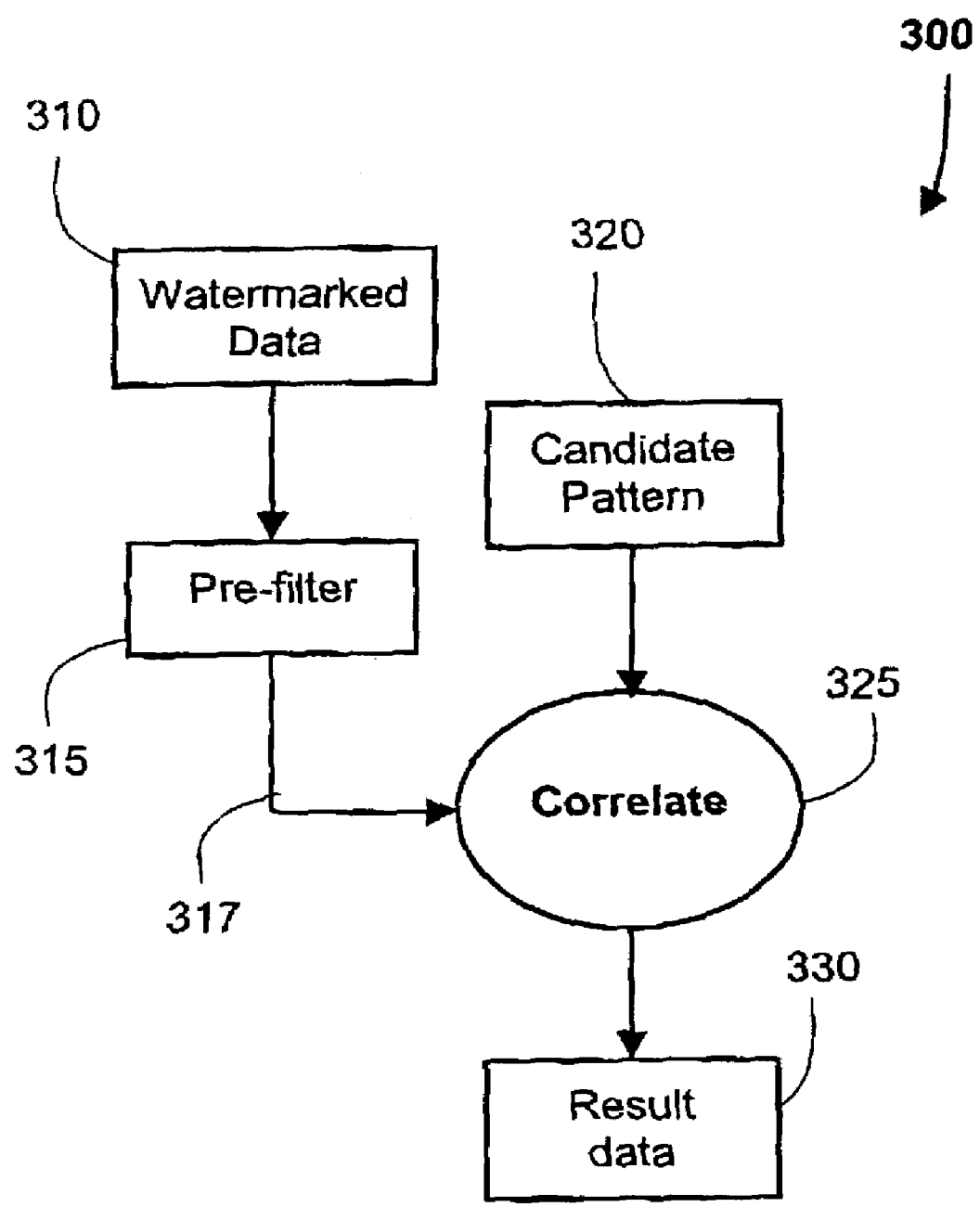
FIG. 3 shows a schematic diagram of a process of detecting a watermark pattern in watermarked data.

FIG. 3 shows a schematic diagram of a process 300 of detecting a watermark pattern in watermarked data 310. The steps of process 300 are also implemented as software executing within the computer system 100. In particular, the steps of process 200 are performed by instructions in the software which is typically resident on the hard disk drive 110 and read and controlled in its execution by the processor 105.

The watermarked data 310, formed using any one of watermarking processes 200 or 250, may be scanned and stored onto the storage device 109, or may be received from the communication network 120. A pre-filter 315 is first applied to the watermarked data 310 to form filtered data 317. The filtered data 317 is then simply correlated 325 with a candidate pattern 320 to form result data 330. If the candidate pattern 320 is present in the watermarked data 310, then the result data 330 will have correlation magnitude peak(s) at centre location(s) where that pattern 320 was embedded into the data 205.

Figure 4:
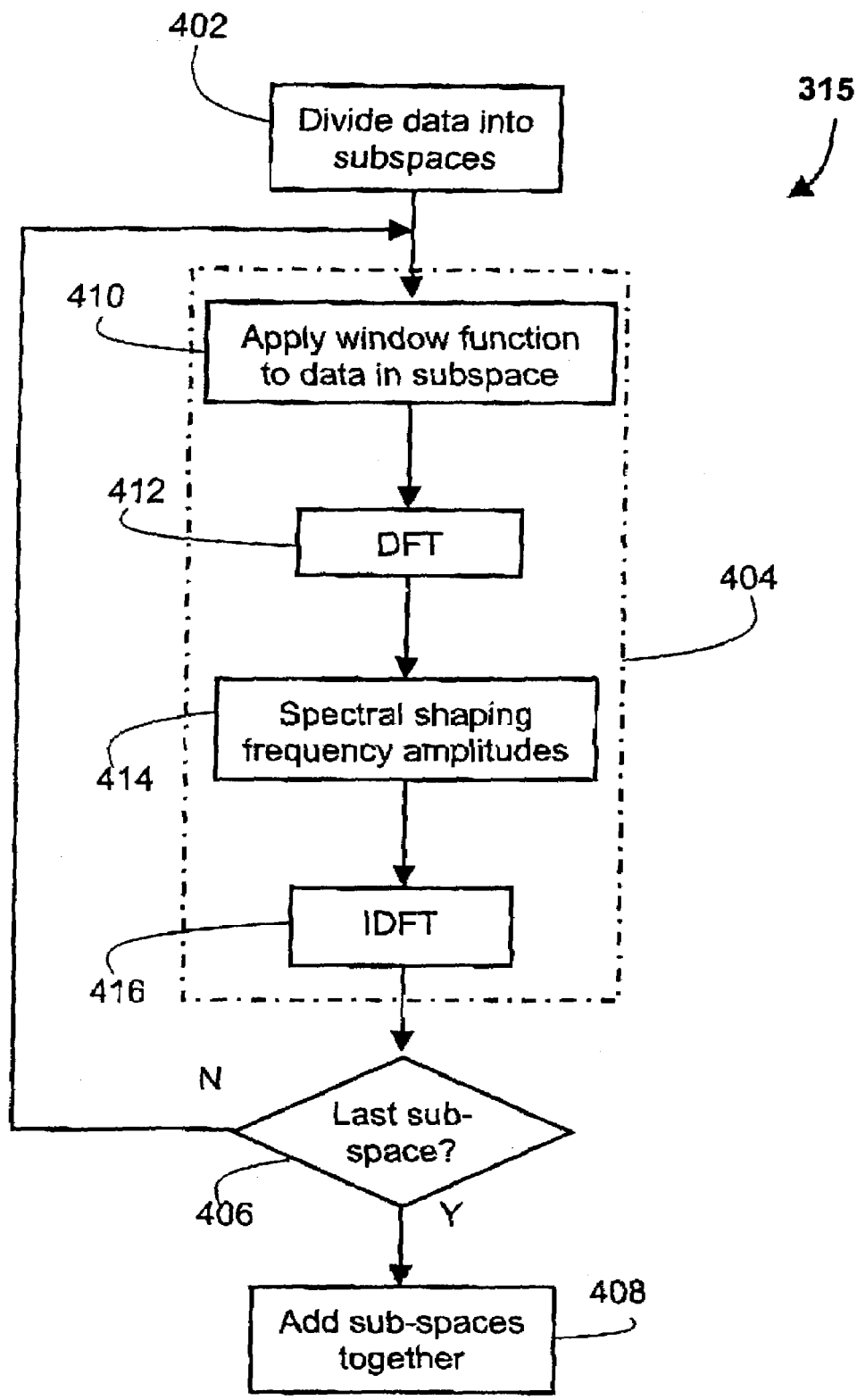
FIG. 4 shows a flow diagram of the steps performed by a pre-filter.

FIG. 4 shows a flow diagram of the steps performed by the pre-filter 315. The pre-filter 315 aims to improve the detection of the embedded watermark pattern(s), and in particular embedded spread-spectrum watermark pattern(s).

Figure 5:
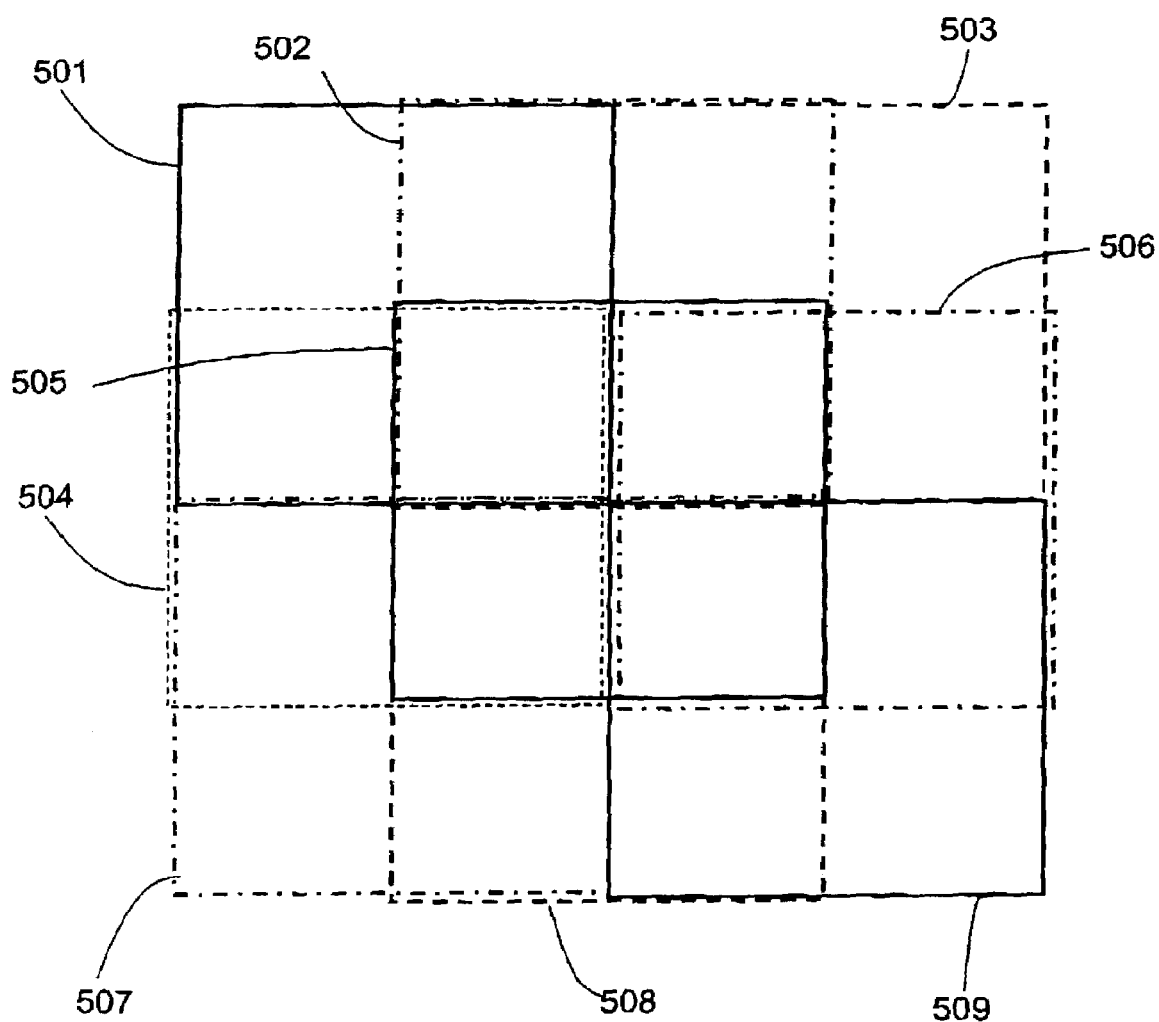
FIG. 5 shows an example of a 128×128-pixel image and its division into 9 overlapping sub-spaces.

The pre-filter 315 starts in step 402 where the watermarked data 310 is divided into a set of smaller sub-spaces. In the preferred implementation, adjacent sub-spaces overlap by half the sub-space's width for reasons that will be set out below. FIG. 5 shows an example of a 128×128-pixel image 500. In the example the image 501 is separated by step 402 into 9 overlapping sub-spaces 501 to 519, each sub-space 501 to 519 having a size of 64×64 pixels The borders of the sub-spaces 501 to 519 are illustrated slightly adjacent the actual border in an attempt to distinguish each sub-space 501 to 519.

In step 404 the processor 105, for each sub-space, computes the frequency coefficients of the watermarked data contained in that sub-space, and then spectrally shapes the frequency amplitudes of the frequency coefficients. Preferably, the amplitudes of the frequency coefficients of the sub-space are set to a predetermined function.

The processor 105 determines in step 406 whether the amplitudes of the frequency coefficients of all the sub-spaces have been set to the predetermined function.

If sub-spaces remain that have not been processed using step 404, then the pre-filtering step 315 returns to step 404 where the next sub-space is processed. The sub-spaces may be processed by step 404 in any order.

When the processor 105 determines in step 406 that the amplitudes of the frequency coefficients of all the sub-spaces have been set to the predetermined function, the pre-filter process 315 continues to step 408 where the processor 105 forms filtered watermarked data, having the same size as that of the watermarked data 310, by adding the filtered data of each sub-space together in the sub-space's original position.

The preferred implementation of step 404 is now described in more detail. The Discrete Fourier Transform (DFT) is preferably used to compute the frequency coefficients of the watermark data contained in the sub-space being processed. However, because the Fourier transform wraps around at the edges of the data to which it is applied, edge effects, and in particular "ringing" artefacts at the edges of every sub-space, are introduced. These artefacts contain a substantial amount of energy not in the watermarked data 310, and will add noise during any subsequent correlation.

To ameliorate these problems, windowing may be used to reduce data values near the edges of each sub-space, causing the wrapped edges of each sub-space to be more continuous. Preferably a Hanning window is applied to each sub-space in sub-step 410 of step 404. In one-dimension and having sub-space size N samples, the Hanning window is defined as:

$$\sin^2\left(\frac{x\pi}{N}\right) \qquad (1)$$

where x is the sample offset of the data sample within the sub-space. Equivalently, in two-dimensions and having a sub-space size of N×N samples, the Hanning window is defined as:

$$\sin^2\left(\frac{x\pi}{N}\right) \times \sin^2\left(\frac{y\pi}{N}\right) \qquad (2)$$

where x and y are the horizontal and vertical sample offsets of the data sample within the sub-space respectively.

Applying the Hanning window to each sub-space results in the loss of a substantial part of the data, because the edges of each sub-space are zeroed or set to very small values. In order to compensate for this effect, overlapping sub-spaces are used in step 402. In step 408 where the filtered watermarked data is formed by adding the filtered data of each sub-space together in the sub-space's original position, that is overlapping adjacent sub-spaces by half the sub-space's width, the data which is most attenuated in the adjacent sub-spaces will be centred in the overlapping sub-space. The Hanning window has the useful property of summing to a value of 1 when overlapped in this manner.

After the window function has been applied to the sub-space in sub-step 410, sub-step 412 of step 404 then computes the DFT of the windowed watermarked data of that sub-space as is known in the art of signal processing. The modulus of each is frequency component in the Fourier transform, except the DC component, is then preferably set to 1 in sub-step 414 of step 404.

Preferably, the DC component in the Fourier transform is set to 0, thereby removing the presence of a unit DC component, which will appear as a constant positive or negative offset within each sub-space. In the final sub-step of step 404, that is sub-step 416, the inverse Discrete Fourier Transform (IDFT) of the modified Fourier Transform data of that sub-space is calculated by the processor 105.

It is noted that the sum of the overlapping sub-spaces and the use of the Hanning window results in pre-filtered data having levels similar to that of the watermarked data 310 except at the borders of the pre-filtered data.

Referring again to step 402 where the watermarked data 310 is separated into the set of smaller sub-spaces, the choice of sub-space size is a trade-off between two factors. If the sub-space size chosen is large, the local effect of the pre-filter 315 is reduced and, in the case where a window is applied, the window causes an amplitude reduction on the edges of the filtered watermarked data, where the edges are dependent on the sub-space size. Contrasted thereto, when the sub-space size chosen is small, the frequency spacings between frequency coefficients are larger.

Process 400 has similarities to phase correlation discussed in the Background section. However, using phase correlation, all spatial frequencies are normalised in the Fourier domain in the final stages of correlation. Process 400 including pre-filter 315 locally normalises spatial frequencies, while leaving the global phase information intact.

The foregoing describes only some embodiments of the present invention, and modifications and/or changes can be made thereto without departing from the scope and spirit of the invention, the embodiments being illustrative and not restrictive.

I claim:

1. A method of pre-processing data including a watermark before detecting said watermark by correlating said data with said watermark, said method comprising the steps of:
   (a) dividing said data into a plurality of sub-spaces, each sub-space being associated with a position within said data;
   (b) for each sub-space, spectral shaping frequency amplitudes of the data of said sub-space to a predetermined function by performing the sub-steps of:
      (b1) transforming said data of said sub-space into frequency coefficients including amplitude and phase;
      (b2) spectral shaping said frequency amplitudes to said predetermined function; and
      (b3) inverse transforming said frequency coefficients; and
   (c) adding said data of said sub-spaces at positions corresponding with said sub-space positions.

2. A method as claimed in claim 1 wherein step (b2) comprises setting all frequency amplitudes excluding a zero frequency amplitude to a predetermined value.

3. A method as claimed in claim 2 wherein said zero frequency amplitude is reduced.

4. A method as claimed in claim 1 wherein step (b1) uses the Discrete Fourier Transform for transforming said data and step (b3) used the Inverse Discrete Fourier Transform for inverse transforming said frequency coefficients.

5. A method as claimed in claim 4 comprising an initial sub-step of step (b) of applying a window function to said data of said sub-space.

6. A method as claimed in claim 5 wherein said window function is a Hanning window function.

7. A method as claimed in claim 1 wherein said sub-spaces are overlapping.

8. An apparatus for pre-processing data including a watermark before detecting said watermark by correlating said data with said watermark, said apparatus comprising:
   means for dividing said data into a plurality of sub-spaces, each sub-space being associated with a position within said data;
   for each sub-space, means for spectral shaping frequency amplitudes of the data of said sub-space to a predetermined function, said means for spectral shaping frequency amplitudes comprising:
      means for transforming said data of said sub-space into frequency coefficients including amplitude and phase;
      means for spectral shaping said frequency amplitudes to said predetermined function; and
      means for inverse transforming said frequency coefficients; and
   means for adding said data of said sub-spaces at positions corresponding with said sub-space positions.

9. An apparatus as claimed in claim 8 wherein said predetermined function is all frequency amplitudes, excluding a zero frequency amplitude, having a predetermined value.

10. An apparatus as claimed in claim 9, wherein said zero frequency amplitude is reduced.

11. An apparatus as claimed in claim 8 wherein the Discrete Fourier Transform is used for transforming said data and the Inverse Discrete Fourier Transform is used for inverse transforming said frequency coefficients.

12. An apparatus as claimed in claim 8 wherein said sub-spaces are overlapping.

13. A program stored in a memory medium for pre-processing data including a watermark before detecting said watermark by correlating said data with said watermark, said program comprising:
   code for dividing said data into a plurality of sub-spaces, each sub-space being associated with a position within said data;
   for each sub-space, code for spectral shaping frequency amplitudes of the data of said sub-space to a predetermined function, wherein said code for spectral shaping comprises:
      code for transforming said data of said sub-space into frequency coefficients including amplitude and phase
      code for spectral shapina said frequency amplitudes to said predetermined function; and
      code for inverse transforming said frequency coefficients; and
   code for adding said data of said sub-spaces at positions corresponding with said sub-space positions.

14. A program as claimed in claim 13 wherein said predetermined function is all frequency amplitudes, excluding a zero frequency amplitude, having a predetermined value.

15. A program as claimed in claim 14 wherein said zero frequency amplitude is reduced.

16. A program as claimed in claim 13 wherein the Discrete Fourier Transform is used for transforming said data and the Inverse Discrete Fourier Transform is used for inverse transforming said frequency coefficients.

17. A program as claimed in claim 13 wherein said sub-spaces are overlapping.

* * * * *

UNITED STATES PATENT AND TRADEMARK OFFICE
CERTIFICATE OF CORRECTION

| | | |
|---|---|---|
| PATENT NO. | : 7,221,774 B2 | Page 1 of 1 |
| APPLICATION NO. | : 10/400581 | |
| DATED | : May 22, 2007 | |
| INVENTOR(S) | : Peter Alleine Fletcher | |

It is certified that error appears in the above-identified patent and that said Letters Patent is hereby corrected as shown below:

Col. 2, line 66, "example" should read --an example of a--.

line 67, after "example" add --of a--.

Col. 5, line 39, "normalise" should read --normalize--.

line 41, "malisation" should read --malization--.

line 44, "would" should read --would be--.

Col. 6, line 8, After "pixels" insert --.--.

line 11, After "step 404" insert --,--.

Col.7, line 38, "normalised" should read --normalized--.

line 40, "normalises" should read --normalizes--.

Col. 8, line 8, "used" should read --uses--.

line 62, "shapina" should read --shaping--.

Signed and Sealed this

Fifteenth Day of April, 2008

JON W. DUDAS
*Director of the United States Patent and Trademark Office*